(12) United States Patent
Kurian

(10) Patent No.: US 7,396,896 B2
(45) Date of Patent: Jul. 8, 2008

(54) POLY(TRIMETHYLENE TEREPHTHALATE) COMPOSITION AND SHAPED ARTICLES PREPARED THEREFROM

(75) Inventor: Joseph V. Kurian, Hockessin, DE (US)

(73) Assignee: E.I. Dupont De Nemours and Company, Wilmington, DE (US)

( * ) Notice: Subject to any disclaimer, the term of this patent is extended or adjusted under 35 U.S.C. 154(b) by 178 days.

(21) Appl. No.: 11/199,647

(22) Filed: Aug. 9, 2005

(65) Prior Publication Data

US 2006/0135734 A1 Jun. 22, 2006

Related U.S. Application Data

(60) Provisional application No. 60/638,002, filed on Dec. 21, 2004.

(51) Int. Cl.
*C08G 64/00* (2006.01)

(52) U.S. Cl. .................. 528/190; 206/96; 206/139; 206/219; 264/176.1; 264/219; 528/271; 528/272

(58) Field of Classification Search ............... 206/96, 206/139, 219; 264/176.1, 219; 528/190, 528/271, 272
See application file for complete search history.

(56) References Cited

U.S. PATENT DOCUMENTS

| 623,948 | A | 4/1899 | Crary |
|---|---|---|---|
| 4,031,165 | A | 6/1977 | Saiki et al. |
| 5,015,789 | A | 5/1991 | Arntz et al. |
| 5,276,201 | A | 1/1994 | Haas et al. |
| 5,284,979 | A | 2/1994 | Haas et al. |
| 5,334,778 | A | 8/1994 | Haas et al. |
| 5,364,984 | A | 11/1994 | Arntz et al. |
| 5,364,987 | A | 11/1994 | Haas et al. |
| 5,633,362 | A | 5/1997 | Nagarajan et al. |
| 5,686,276 | A | 11/1997 | Laffend et al. |
| 5,821,092 | A | 10/1998 | Nagarajan et al. |
| 5,962,745 | A | 10/1999 | Brossmer et al. |
| 6,140,543 | A | 10/2000 | Brossmer et al. |
| 6,232,511 | B1 | 5/2001 | Haas et al. |
| 6,254,950 | B1 | 7/2001 | Rogers et al. |
| 6,277,289 | B1 | 8/2001 | Kurian et al. |
| 6,281,325 | B1 | 8/2001 | Kurian et al. |
| 6,297,408 | B1 | 10/2001 | Haas et al. |
| 6,331,264 | B1 | 12/2001 | Kurian et al. |
| 6,342,646 | B1 | 1/2002 | Haas et al. |
| 6,538,076 | B2 | 3/2003 | Giardino et al. |
| 6,921,803 | B2 * | 7/2005 | Chang et al. ............ 528/308.7 |
| 2004/0225161 | A1 | 11/2004 | Sunkara et al. |
| 2004/0260125 | A1 | 12/2004 | Seapan et al. |
| 2005/0069997 | A1 | 3/2005 | Adkesson et al. |

FOREIGN PATENT DOCUMENTS

| EP | 0 538 774 | A2 | 4/1993 |
|---|---|---|---|
| EP | 0 646 453 | A1 | 4/1995 |
| EP | 1 347 005 | A1 | 9/2003 |
| JP | 56 146738 | A | 11/1981 |
| JP | 59 230022 | A | 12/1984 |
| JP | 03 084027 | A | 4/1991 |
| JP | 05 084808 | A1 | 4/1993 |
| JP | 3382121 | B2 | 3/2003 |

* cited by examiner

*Primary Examiner*—Terressa Boykin

(57) ABSTRACT

Poly(trimethylene dicarboxylate) prepared by polycondensation of: (a) 1,3-propanediol; (b) aliphatic or aromatic diacid or diester; and (c) from about 0.01 to about 0.2 mole %, based on the total number of moles of 1,3-propanediol and diacid or ester, of polyfunctional reactant containing three or more carboxylic acid type groups or hydroxy groups. Shaped articles, including bottles, are made from the poly(trimethylene dicarboxylate).

33 Claims, No Drawings

POLY(TRIMETHYLENE TEREPHTHALATE) COMPOSITION AND SHAPED ARTICLES PREPARED THEREFROM

CROSS-REFERENCE TO RELATED APPLICATIONS

This application claims priority benefit of U.S. provisional application 60/638,002, filed on Dec. 21, 2004, which is hereby incorporated by reference.

FIELD OF THE INVENTION

This invention relates to poly(trimethylene dicarboxylate) with improved melt viscosity and melt strength properties and its use in shaped articles, in particular bottles.

BACKGROUND OF THE INVENTION

Poly(ethylene terephthalate) (also referred to as "PET") is widely used in the manufacture of shaped articles such as a bottles, containers, compression or injection molded parts, tiles, films, engineered components, etc. Poly(trimethylene terephthalate) (also referred to as "PTT") has recently received much attention as a polymer for use in textiles, flooring, packaging and other end uses. However, it has not found wide application in bottles, containers and other molded goods in spite of its having many superior properties compared to PET. For example, it has better thermal properties than PET, better electrostatic properties, and better barrier characteristics against water vapor, flavors and gases, characteristics which should be an advantage over PET in bottles and containers.

Essentially, the reason that PTT has not received wider use in these shaped article applications in spite of its excellent end use properties (e.g., in fibers) is that the preparation of shaped articles such as bottles and containers from PTT by compression, injection or blow molding requires high melt strength and/or melt viscosity, a property which has not been consistently achieved with the PTT polymers currently described in the art. Consequently, it is the purpose of this invention to provide PTT with increased melt viscosity and melt strength, useful in the preparation of shaped articles, in particular, bottles.

Japanese Patent Application Publication No. 56-146738 discloses bottles made from PET where no more than 20 mole % of the ethylene glycol used in its preparation can be replaced by other diols such as trimethylene glycol. Also disclosed is the use of 2 mole % or less of polyols and/or polycarboxylic acids such as trimethylolpropane, pentaerythritol, trimellitic acid, and trimesic acid.

Japanese Patent No. 3382121 discloses the use of polyols such as trimethylolpropane, pentaerythritol, glycerine, etc., and polybasic acids such as trimellitic acid, pyromellitic acid in preparation of polyester at the level of 0.1 to 5 mole % of the reactants. The diols disclosed for use in preparing the polyesters are ethylene glycol, diethylene glycol, triethylene glycol, propylene glycol, 1,4-butanediol, 1,6-hexanediol, neopentyl glycol, dimer diol, cyclohexanediol, cyclohexane dimethanol, and their ethylene oxide addition products. Japanese Unexamined Patent Publication 2003-12813 discloses the use of polyols and/or polybasic acids at a level of 1 mole % or less, preferably 0.5 mole % or less, as a branching component in PTT with improved moldability.

None of these references disclose PTT containing low levels of polyols or polybasic acids with the melt viscosity properties suitable for preparing shaped articles, particularly bottles.

SUMMARY OF THE INVENTION

This invention is directed to a poly(trimethylene dicarboxylate) prepared by polycondensation of: (a) 1,3-propanediol; (b) aliphatic or aromatic diacid or diester; and (c) from about 0.01 to about 0.2 mole %, based on the total number of moles of 1,3-propanediol and diacid or ester, of polyfunctional reactant containing three or more carboxylic acid type groups or hydroxy groups.

Preferably, the polyfunctional reactant is selected from the group consisting of polycarboxylic acid having at least three carboxyl groups and polyols having at least three hydroxyl groups, or mixtures thereof. Preferably the polyfunctional reactant is polycarboxylic acid having 3 to 4 carboxyl groups, more preferably having 3 carboxyl groups. Preferably the polyfunctional reactant is polyol having 3-4 hydroxyl groups, more preferably having 3 hydroxyl groups.

The 1,3-propanediol ("PDO") is preferably derived from a fermentation process using a renewable biological source. PDO made by other routes are also useful.

Preferably the aliphatic or aromatic diacid or diester is selected from the group consisting of aromatic dicarboxylic acids and esters and combinations thereof.

In a preferred embodiment the poly(trimethylene dicarboxylate) is poly(trimethylene terephthalate) wherein the diacid or ester comprises terephthalic acid or an ester thereof (e.g., dimethyl terephthalate).

In one preferred embodiment, the polyfunctional reactant is the polycarboxylic acid having at least three carboxyl groups. In another preferred embodiment, the polyfunctional reactant is the polyols having at least three hydroxyl groups.

In one embodiment the polyfunctional reactant comprises polycarboxylic acid selected from the group consisting of trimesic acid, pyromellitic acid, pyromellitic dianhydride, benzophenone tetracarboxylic acid anhydride, trimellitic acid anhydride, benzenetetracarboxylic acid anhydride, hemimellitic acid, trimellitic acid, 1,1,2,2, ethanetetracarboxylic acid, 1,2,2-ethanetricarboxylic acid, 1,3,5-pentanetricarboxylic acid, 1,2,3,4-cyclopentanecarboxylic acid, and mixtures thereof.

In another embodiment the polyfunctional reactant comprises polyol selected from the group consisting of glycerine, pentaerythritol, 2-(hydroxymethyl)-1,3-propanediol, trimethylolpropane, and mixtures thereof.

Preferably the polyfunctional reactant comprises trimesic acid. More preferably, the poly(trimethylene dicarboxylate) is poly(trimethylene terephthalate) and the polyfunctional reactant comprises trimesic acid.

In another embodiment of the invention, poly(trimethylene terephthalate) is prepared by a process comprising contacting diacid or an ester thereof with a 1:1 (preferably 1.2:1, and more preferably 1.5:1) to 3:1 (preferably 2:1) molar amount of 1,3-propanediol and polyfunctional reactant in an amount of from about 0.01 to about 0.2 mole % based on the total number of moles of 1,3-propanediol and diacid or ester, in the presence of polycondensation catalyst to form a bis(3-hydroxypropyl) terephthalate monomer containing polyfunctional reactant, and polymerizing them (i.e., the foregoing reactants) to obtain the poly(trimethylene terephthalate).

The poly(trimethylene dicarboxylate) of the invention will preferably have a higher melt viscosity and melt strength than poly(trimethylene dicarboxylate) made in the same way except that it contains no polyfunctional reactant.

In another embodiment the invention relates to a shaped article made from the poly(trimethylene dicarboxylate) poly (trimethylene naphthalate), preferably poly(trimethylene terephthalate), of the invention. The shaped article preferably is suitable for use as a bottle, container, compression or injection molded part, tile, film, or engineered component, and may further comprise mineral filler.

In particular, the invention relates to a bottle comprised of the poly(trimethylene dicarboxylate). Preferably, the poly(trimethylene dicarboxylate) is poly(trimethylene terephthalate) or poly(trimethylene naphthalate). In one preferred embodiment, the bottle comprises a blend of poly(trimethylene dicarboxylate) and poly(ethylene dicarboxylate), preferably a blend of 35-65 weight % (more preferably 40-60 weight %) poly(trimethylene dicarboxylate) and 65-35 weight % (more preferably 60-40 weight %) poly(ethylene dicarboxylate), by weight of the polymer in the blend. Preferably the bottle comprises mineral filler.

The invention is also directed to a process of making a shaped article comprising making a parison comprising the poly(trimethylene dicarboxylate) and blowing the parison into the shaped article. Preferably this shaped article is a container, more preferably a bottle.

DETAILED DESCRIPTION OF THE INVENTION

Applicants specifically incorporate the entire content of all cited references in this disclosure. Unless stated otherwise, all percentages, parts, ratios, etc., are by weight. Trademarks are shown in upper case. Further, when an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

This invention relates to poly(trimethylene dicarboxylates) prepared from 1,3-propanediol, aromatic or aliphatic dicarboxylic acids or their esters, and small amount of polyols or polycarboxylic acids.

The 1,3-propanediol employed for preparing the 1,3-propanediol based homo- or copolyether base stocks may be obtained by any of the various chemical routes or by biochemical transformation routes. Preferred routes are described in U.S. Pat. Nos. 5,015,789, 5,276,201, 5,284,979, 5,334,778, 5,364,984, 5,364,987, 5,633,362, 5,686,276, 5,821,092, 5,962,745, 6,140,543, 6,232,511, 623,948, 6,277, 289, 6,297,408, 6,331,264 and 6,342,646, and U.S. patent application Ser. Nos. 10/839,188, filed May 5, 2004, Ser. No. 10/839,655, filed May 4, 2004 and Ser. No. 10/634,666, filed Aug. 5, 2003, all of which are incorporated herein by reference in their entireties.

The most preferred source of 1,3-propanediol is a fermentation process using a renewable biological source. As an illustrative example of a starting material from a renewable source, biochemical routes to 1,3-propanediol (PDO) have been described that utilize feedstocks produced from biological and renewable resources such as corn feed stock. For example, bacterial strains able to convert glycerol into 1,3-propanediol are found in e.g., in the species Klebsiella, Citrobacter, Clostridium, and Lactobacillus. The technique is disclosed in several patents, including, U.S. Pat. Nos. 5,633, 362, 5,686,276, and 5,821,092. In U.S. Pat. No. 5,821,092, Nagarajan et al. disclose, inter alia, a process for the biological production of 1,3-propanediol from glycerol using recombinant organisms. The process incorporates *E. coli* bacteria, transformed with a heterologous pdu diol dehydratase gene, having specificity for 1,2-propanediol. The transformed *E. coli* is grown in the presence of glycerol as a carbon source and 1,3-propanediol is isolated from the growth media. Since both bacteria and yeasts can convert glucose (e.g., corn sugar) or other carbohydrates to glycerol, the process of the invention provided a rapid, inexpensive and environmentally responsible source of 1,3- propanediol monomer.

The 1,3-propanediol starting material for the present invention may also contain up to 50%, preferably no more than about 20%, more preferably no more than about 10%, even more preferably no more than about 5%, more preferably no more than about 1%, by weight, of the total diols, of comonomer diols in addition to the reactant 1,3-propanediol or its dimers and trimers without detracting from the products and processes of the invention. Examples of preferred comonomer diols include ethylene glycol, 2-methyl-1,3-propanediol, 2,2-dimethyl-1,3-propane diol and $C_6$-$C_{12}$ diols such as 2,2-diethyl-1,3-propane diol, 2-ethyl-2-(hydroxymethyl)-1,3-propane diol, 1,6-hexanediol, 1,8-octanediol, 1,10-decanediol, 1,12-dodecanediol, 1,4-cyclohexanediol, and 1,4-cyclohexanedimethanol.

Preferably the 1,3-propanediol used as the reactant or as a component of the reactant will have a purity of greater than about 99% by weight as determined by gas chromatographic analysis.

The dicarboxylic acid component of the poly(trimethylene carboxylate) is meant to include unsubstituted and substituted aromatic, aliphatic, unsaturated, and alicyclic dicarboxylic acids and the lower alkyl esters of dicarboxylic acids having from 2 carbons to 36 carbons. Specific examples of the desirable dicarboxylic acid component include terephthalic acid, dimethyl terephthalate, isophthalic acid, dimethyl isophthalate, 2,6-napthalene dicarboxylic acid, dimethyl-2,6-naphthalate, 2,7-naphthalenedicarboxylic acid, dimethyl-2,7-naphthalate, 3,4'-diphenyl ether dicarboxylic acid, dimethyl-3,4'diphenyl ether dicarboxylate, 4,4'-diphenyl ether dicarboxylic acid, dimethyl-4,4'-diphenyl ether dicarboxylate, 3,4'-diphenyl sulfide dicarboxylic acid, dimethyl-3, 4'diphenyl sulfide dicarboxylate, 4,4'-diphenyl sulfide dicarboxylic acid, dimethyl-4,4'-diphenyl sulfide dicarboxylate, 3,4'-diphenyl sulfone dicarboxylic acid, dimethyl-3,4'-diphenyl sulfone dicarboxylate, 4,4'-diphenyl sulfone dicarboxylic acid, dimethyl-4,4'-diphenyl sulfone dicarboxylate, 3,4'benzophenonedicarboxylic acid, dimethyl-3,4'-benzophenonedicarboxylate, 4,4'-benzophenonedicarboxylic acid, dimethyl-4,4'-benzophenonedicarboxylate, 1,4-naphthalene dicarboxylic acid, dimethyl-1,4-naphthalate, 4,4'-methylene bis(benzoic acid), dimethyl-4,4'methylenebis(benzoate), oxalic acid, dimethyl oxalate, malonic acid, dimethyl malonate, succinic acid, dimethyl succinate, methylsuccinc acid, glutaric acid, dimethyl glutarate, 2-methylglutaric acid, 3-methylglutaric acid, adipic acid, dimethyl adipate, 3-methyladipic acid, 2,2,5,5-tetramethylhexanedioic acid, pimelic acid, suberic acid, azelaic acid, dimethyl azelate, sebacic acid, 1,11-undecanedicarboxylic acid, 1,10-decanedicarboxylic acid, undecanedioic acid, 1,12-dodecanedicarboxylic acid, hexadecanedioic acid, docosanedioic acid, tetracosanedioic acid, dimer acid, 1,4-cyclohexanedicarboxylic acid, dimethyl-1,4-cyclohexanedicarboxylate, 1,3-cyclohexanedicarboxylic acid, dimethyl-1,3-cyclohexanedicarboxylate, 1,1-cyclohexanediacetic acid, metal salts of 5-sulfodimethylisopthalate, fumaric acid, maleic anhydride, maleic acid, hexahydrophthalic acid, phthalic acid and the like and mixtures derived therefrom. This should not be considered limiting. Essentially any dicarboxylic acid known within the art may find utility within the present invention.

Generally, the preferred dicarboxylic acids for use in the invention are aromatic dicarboxylic acids, and most preferred is terephthalic acid or an ester thereof (e.g., dimethyl terephthalate). Preferably greater than about 70 mole %, more preferably greater than about 90 mole % (based on the total number of moles of dicarboxylic acid) of the dicarboxylic acid component will be from terephthalic acid or dimethyl terephthalate. Most preferably, the dicarboxylic acid will be greater than about 99 mole % terephthalic acid or dimethyl terephthalate.

When bottles or other articles having good barrier properties are desired, the preferred dicarboxylic acids for use in the invention are preferably terephthalic acid, 2,6-naphthalene dicarboxylic acid, dimethyl terephthalate and dimethyl-2,6-naphthalate. Preferably greater than about 70 mole %, more preferably greater than about 90 mole % (based on the total number of moles of dicarboxylic acid) of the dicarboxylic acid component will be from terephthalic acid, 2,6-naphthalene dicarboxylic acid, dimethyl terephthalate and dimethyl-2,6-naphthalate. Most preferably, the dicarboxylic acid will be greater than about 99 mole % terephthalic acid, 2,6-naphthalene dicarboxylic acid, dimethyl terephthalate and dimethyl-2,6-naphthalate.

When bottles or other articles having good barrier properties are desired, the poly(trimethylene dicarboxylate) can be blended with poly(ethylene dicarboxylate). Preferably the blend comprises 35-65 weight % (more preferably 40-60 weight %) poly(trimethylene dicarboxylate) and 65-35 weight % (more preferably 60-40 weight %) poly(ethylene dicarboxylate), by weight of the polymer in the blend. Preferably, the poly(trimethylene dicarboxylate) is poly(trimethylene terephthalate) or poly(trimethylene naphthalate), most preferably poly(trimethylene terephthalate). Preferably, the poly(ethylene dicarboxylate) is poly(ethylene terephthalate) or poly(ethylene naphthalate), most preferably poly(ethylene terephthalate). Preferably the bottle comprises mineral filler.

The poly(trimethylene dicarboxylates) of the invention will also contain from about 0.01 to about 0.2 mole %, preferably from about 0.02 to about 0.1 mole %, based on the total number of moles of 1,3-propanediol and diacid or ester, of a polyfunctional reactant. The polyfunctional reactant serves as a branching agent.

The polyfunctional reactant is meant to include any compound with three or more carboxylic acid type groups or hydroxy groups (e.g., a polyfunctional reactant with two carboxylic acid type groups and one hydroxy groups), or a mixture thereof. Preferably, the polyfunctional reactant is selected from the group consisting of polycarboxylic acid having at least three carboxyl groups and polyols having at least three hydroxyl groups, or mixtures thereof. Preferably the polyfunctional reactant is polycarboxylic acid having 3 to 4 carboxyl groups, more preferably having 3 carboxyl groups. Preferably the polyfunctional reactant is polyol having 3-4 hydroxyl groups, more preferably having 3 hydroxyl groups.

The term "carboxylic acid type groups" is meant to include carboxylic acids, lower alkyl esters of carboxylic acids, glycolate esters of carboxylic acids, acid anhydrides, acid halides, and mixtures thereof.

Specific examples of the desirable polyfunctional branching agent component include 1,2,4-benzenetricarboxylic acid (trimellitic acid), trimesic acid, trimethyl-1,2,4-benzenetricarboxylate, tris(2-hyroxyethyl)-1,2,4-benzenetricarboxylate, trimethyl-1,2,4-benzenetricarboxylate, 1,2,4-benzenetricarboxylic anhydride (trimellitic anhydride), 1,3,5-benzenetricarboxylic acid, 1,2,4-benzenetetracarboxylic acid, 1,2,4,5-benzenetetracarboxylic acid (pyromellitic acid), 1,2,4,5-benzenetetracarboxylic dianhydride (pyromellitic anhydride), 3,3',4,4'-benzophenonetetracarboxylic dianhydride, 1,4,5,8-naphthalenetetracarboxylic dianhydride, citric acid, tetrahydrofuran-2,3,4,5-tetracarboxylic acid, 1,3,5-cyclohexanetricarboxylic acid, pentaerythritol, trimethylolpropane, 2-(hydroxymethyl)-1,3-propanediol, 2,2-bis(hydroxymethyl)propionic acid, trimer acid, and the like, and mixtures thereof. This list should not be considered limiting. Essentially any polyfunctional material which includes three or more carboxylic acid or hydroxyl functions may find use within the present invention.

The poly(trimethylene terephthalate) is preferably prepared by a process comprising contacting diacid or an ester thereof with a 1:1 (preferably 1.2:1, and more preferably 1.5:1) to 3:1 (preferably 2:1) molar amount of 1,3-propanediol and polyfunctional reactant in an amount of from about 0.01 to about 0.2 mole % based on the total number of moles of 1,3-propanediol and diacid or ester, in the presence of polycondensation catalyst to form a bis(3-hydroxypropyl) terephthalate monomer containing polyfunctional reactant, and polymerizing them (i.e., the foregoing reactants) to obtain the poly(trimethylene terephthalate).

Methods for preparation of the poly(trimethylene dicarboxylates), in particular poly(trimethylene terephthalate) have been well documented in the art. A preferred method is described in U.S. Pat. No. 6,281,325, which is incorporated herein by reference in its entirety. This patent discloses a preferred method for the preparation of poly(trimethylene terephthalate) by contacting terephthalic acid with 1,3-propanediol in the presence of a catalyst to form a bis(3-hydroxypropyl)terephthalate monomer; and then polymerizing that monomer to obtain the desired poly(trimethylene terephthalate). In the present invention the polyfunctional reactant is preferably added to the reaction mixture of 1,3-propanediol and terephthalic acid used to prepare the bis(3-hydroxypropyl)terephthalate, but could be added at any stage in the polycondensation. Poly(trimethylene dicarboxylates) with increased melt viscosity and melt strength can also be prepared from a remelt process by polymer melt blending. The preferred process for maximum benefit is the addition of the polyfunctional reactant to the reaction mixture of 1,3-propanediol and dicarboxylic acid or diester.

A preferred continuous process for making poly(trimethylene dicarboxylates) is described in U.S. Pat. No. 6,538,076, which is incorporated herein by reference.

Any of the catalysts well known in the art may be used in the polyesterification reaction. The amount of catalyst is not critical, but generally will be used at the level of from about 20 to about 200 ppm based on the total amount of reactants. Preferred catalysts are organic tin-containing compounds and organic titanates. Examples of preferred tin compounds include, but are not limited to, n-butylstannoic acid, octylstannoic acid, dimethyltin oxide, dibutyltin oxide, dioctyltin oxide, diphenyltin oxide, tri-n-butyltin acetate, tri-n-butyltin chloride, tri-n-butyltin fluoride, triethyltin chloride, triethyltin bromide, triethyltin acetate, trimethyltin hydroxide, triphenyltin chloride, triphenyltin bromide, triphenyltin acetate, or combinations of two or more thereof. Tin oxide catalysts are preferred. Examples of preferred titanates are tetraethyltitanate, tetrapropyltitanate, and tetrabutyltitanate. The preferred titanate is tetraisopropyl titanate, commercially available as TYZOR®TPT from E.I. du Pont de Nemours and Company.

Additives known in the art such as antioxidants, UV stabilizers, pigments (e.g., $TiO_2$, etc.), flame retardants, antistats, dyes, mineral fillers and compounds that enhance the process, etc., may also be incorporated in the poly(trimethylene carboxylates) of the invention.

The most significant reason why poly(trimethylene terephthalate) has not been widely used in shaped articles such as bottles is that the melt strength and/or melt viscosity of the heretofore prepared materials has been inadequate for efficient processing. The advantage of the polymers of the present invention is that they generally have melt viscosity and/or melt strength that is higher than polymers made in the same way from the same from 1,3-propanediol and dibasic acid or ester, except that they contains no polyfunctional reactant.

Examples of the shaped articles that can be prepared from the poly(trimethylene terephthalate) of the invention include but are not limited to containers (e.g., bottles), compression or injection molded parts, tiles, films, and engineered components. These can be prepared by injection molding, extrusion molding, compression molding and blow molding. Bottles are generally prepared by processes that include a blow molding step. For example a typical polyester bottle process is carried out in two distinct steps; first, the polyester is melted in an extruder and injected into a mold forming a preform or parison; second, the preform is then blown into the final bottle shape. This process, or any of the processes well known in the art, for manufacturing bottles may be used for preparing the bottles of the invention.

EXAMPLES

Example 1

This example illustrates preparation of modified poly(trimethylene terephthalate) from dimethyl terephthalate, 1,3-propanediol and trimesic. Acid with tetraisopropyl titanate (TYZOR® TPT) as the catalyst.

A 25 gallon autoclave was charged with 49.9 kg of terephthalic acid, 37.4 kg of 1,3-propanediol for a mole ratio of 1,3-propanediol:TPA of 1.6:1, 63.2 g of trimesic acid for a weight concentration of 1000 ppm in final polymer, 3.2 kg of water, and 13.5 g of TYZOR® TPT. The temperature was raised to 210° C. and held for 3.5 hours. Water generated was removed as a liquid condensate by distillation.

After evolution of water had ceased, the resulting monomer, bis(3-hydroxypropyl) terephthalate, was transferred to a different clave and polymerized at a temperature of 250° C. and a pressure of 0.5 mm for 3.5 hours. The product polymer was cast into ribbons and cut into pellets. The intrinsic viscosity was 0.69 dl/g.

Example 2

The polymer prepared in Example 1 was crystallized at 150° C. for 2 hours and 170° C. for 3 hours, then solid phase polymerized at 205° C. for 19 hours. The final intrinsic viscosity of the polymer was 1.81 dl/g.

Example 3

The polymer prepared in Example 1 was crystallized at 170° C. for 3 hours, then solid phase polymerized at 205° C. for 7 hours. The final intrinsic viscosity of the polymer was 1.31 dl/g.

Comparative Example 4

This example describes preparation of homo-poly(trimethylene terephthalate) containing no polyfunctional reactant A commercial autoclave was charged with 4000 kg of dimethyl terephthalate, 2185 kg of 1,3-propanediol (mole ratio of 1,3-propanediol:DMT of 1.4:1), and 1.6 kg of TYZOR® TPT. The temperature was raised to 185° C. and held for 6 hours. Methanol generated was removed as a liquid condensate by distillation.

After evolution of methanol had ceased, the resulting monomer, bis(3-hydroxypropyl) terephthalate, was transferred to a different clave and polymerized at 250° C. for 6 hours and 25 minutes. The obtained poly(trimethylene terephthalate) resin was pelletized. The intrinsic viscosity of the polymer was 0.657 dl/g.

The obtained polymer was crystallized at 170° C. for 3 hours, then solid phase polymerized at 205° C. The final intrinsic viscosity of the polymer was 1.3 dl/g.

Example 5

Polymers from Example 2, Example 3 and Comparative Example 4 were blown to make bottles. The blow molder used to make bottles was from Rosale Machine Design Co. Inc., Leominster, Mass. The operation conditions are listed in Table 1, and the results of bottle making are listed in Table 2.

TABLE 1

Operation Conditions for Blow Molder

| Rear | Center | Front | Head SQ | Head RD | Nozzle | Air/PRE Blow | Blow | Eject |
|---|---|---|---|---|---|---|---|---|
| 240° C. | 240° C. | 240° C. | 240° C. | 240° C. | 240° C. | 6 psi | 60 psi | 60 psi |

| Cycle Down | Cycle Up | Cutter | Clamp | RPM | HYD Press | Water | Oil TEMP | Cold TEMP |
|---|---|---|---|---|---|---|---|---|
| 60 psi | 30 psi | 80% | 20 sec. | 70 | 1500 psi | On | 100° C. | Cold |

TABLE 2

Results of Bottle Making

| Example 2 Polymer | Example 3 Polymer | Comp. Example 4 Polymer |
|---|---|---|
| Excellent bottles | Good bottles | No bottle could be made |

Thus, good quality bottles could be blown from the polymers modified with trimesic acid, while the control polymer with same intrinsic viscosity could not be prepared into bottles. The physical properties of the bottles made are listed in Table 3.

TABLE 3

Bottle Physical Properties

| Sample | Width/Thickness (in) | Stress @Yield (KSI) | Strain @Yield | MAX Stress (KSI) | Strain @MAX | Stress @Break (KSI) | Strain @Break |
|---|---|---|---|---|---|---|---|
| Example 2 Polymer MD | 0.187/ 0.044 | 6.88 | 3.66% | 7.59 | 332.5% | 7.47 | 334.6% |
| Example 3 Polymer MD | 0.187/ 0.035 | 4.78 | 3.82% | 5.66 | 298.2% | 5.59 | 327% |

TABLE 3-continued

Bottle Physical Properties

| Sample | Width/Thickness (in) | Stress @Yield (KSI) | Strain @Yield | MAX Stress (KSI) | Strain @MAX | Stress @Break (KSI) | Strain @Break |
|---|---|---|---|---|---|---|---|
| Example 2 Polymer XD | 0.187/ 0.043 | 6.46 | 4.13% | 7.57 | 275.4% | 7.53 | 318.3% |
| Example 3 Polymer XD | 0.187/ 0.032 | 3.77 | 2.74% | 4.55 | 193.7% | 4.52 | 268% |

The data of Table 3 indicate that polymers with higher intrinsic viscosity, melt viscosity and melt strength have better physical properties and better suited for bottles.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the disclosure.

What is claimed is:

1. A poly(trimethylene dicarboxylate) prepared by polycondensation of: (a) a glycol component comprising 1,3-propanediol; (b) aliphatic or aromatic diacid or diester; and (c) from about 0.01 to about 0.2 mole %, based on the total number of moles of said glycol component and diacid or ester, of polyfunctional reactant containing three or more carboxylic acid type groups or hydroxy groups;
wherein comonomers in the glycol component other than 1,3-propanediol are not more than 10% by weight of said glycol component;
wherein said poly(trimethylene dicarboxylate) further comprises comonomer repeat units derived from the group consisting of ethylene glycol, 2-methyl-1,3-propanediol, 2,2-dimethyl-1,3-propane diol, and $C_6$-$C_{12}$ diols; and
wherein said polyfunctional reactant is not pyromellitic dianhydride.

2. The poly(trimethylene dicarboxylate) of claim 1 wherein the polyfunctional reactant is selected from the group consisting of polycarboxylic acid having at least three or more carboxyl groups, and polyols having at least three or more hydroxyl groups, or mixtures thereof.

3. The poly(trimethylene dicarboxylate) of claim 1 wherein the polyfunctional reactant is polycarboxylic acid having 3 to 4 carboxyl groups.

4. The poly(trimethylene dicarboxylate) of claim 1 wherein the polyfunctional reactant is polyol having 3-4 hydroxyl groups.

5. The poly(trimethylene dicarboxylate) of claim 1 wherein the polyfunctional reactant is polycarboxylic acid having 3 carboxyl groups.

6. The poly(trimethylene dicarboxylate) of claim 1 wherein the polyfunctional reactant is polyol having 3 hydroxyl groups.

7. The poly(trimethylene dicarboxylate) of claim 2 wherein the aliphatic or aromatic diacid or diester is selected from the group consisting of aromatic dicarboxylic acids and esters and combinations thereof.

8. The poly(trimethylene dicarboxylate) of claim 2 that is poly(trimethylene terephthalate) wherein the diacid or ester comprises terephthalic acid or an ester thereof.

9. The poly(trimethylene dicarboxylate) of claim 8 wherein the polyfunctional reactant comprises polycarboxylic acid selected from the group consisting of trimesic acid, pyromellitic acid, benzophenone tetracarboxylic acid anhydride, trimellitic acid anhydride, benzenetetracarboxylic acid anhydride, hemimellitic acid, trimellitic acid, 1,1,2,2, ethanetetracarboxylic acid, 1,2,2-ethanetricarboxylic acid, 1,3,5-pentanetricarboxylic acid, 1,2,3,4-cyclopentanecarboxylic acid, and mixtures thereof.

10. The poly(trimethylene dicarboxylate) of claim 8 wherein the polyfunctional reactant comprises polyol selected from the group consisting of glycerine, pentaerythritol, 2-(hydroxymethyl)-1,3-propanediol, trimethylolpropane and mixtures thereof.

11. The poly(trimethylene dicarboxylate) of claim 1 wherein the polyfunctional reactant comprises trimesic acid.

12. The poly(trimethylene terephthalate) of claim 1 prepared by a process comprising contacting terephthalic acid or an ester thereof with a 1:1 to 3:1 molar amount of 1,3-propanediol and polyfunctional reactant in an amount of from about 0.01 to about 0.2 mole % based on the total number of moles of 1,3-propanediol and diacid or ester, in the presence of polycondensation catalyst to form a bis(3-hydroxypropyl) terephthalate monomer containing polyfunctional reactant, and polymerizing them to obtain the poly(trimethylene terephthalate).

13. The poly(trimethylene terephthalate) of claim 1 prepared by a process comprising contacting terephthalic acid or an ester thereof with a 1.2:1 to 2:1 molar amount of 1,3-propanediol and polyfunctional reactant in an amount of from about 0.01 to about 0.2 mole % based on the total number of moles of 1,3-propanediol and diacid or ester, in the presence of polycondensation catalyst to form a bis(3-hydroxypropyl) terephthalate monomer containing polyfunctional reactant, and polymerizing them to obtain the poly(trimethylene terephthalate).

14. The poly(trimethylene terephthalate) of claim 1 prepared by a process comprising contacting terephthalic acid or an ester thereof with a 1.5:1 to 2:1 molar amount of 13-propanediol and polyfunctional reactant in an amount of from about 0.01 to about 0.2 mole % based on the total number of moles of 1,3-propanediol and diacid or ester, in the presence of polycondensation catalyst to form a bis(3-hyd roxypropyl) terephthalate monomer containing polyfunctional reactant, and polymerizing them to obtain the poly(trimethylene terephthalate).

15. The poly(trimethylene dicarboxylate) of claim 1 wherein the 1,3-propanediol is derived from a fermentation process using a renewable biological source.

16. The poly(trimethylene dicarboxylate) of claim 1 that has a higher melt viscosity than poly(trimethylene dicarboxylate) made in the same way except that it contains no polyfunctional reactant.

17. The poly(trimethylene dicarboxylate) of claim 1 that has a higher melt strength than poly(trimethylene dicarboxylate) made in the same way except that it contains no polyfunctional reactant.

18. The poly(trimethylene dicarboxylate) of claim 1 wherein the comonomer diols are selected from the group consisting of ethylene glycol, 2-methyl-1,3-propanediol, 2,2-dimethyl-1,3-propane diol and $C_6$-$C_{12}$ diols.

19. The poly(trimethylene dicarboxylate) of claim 1 wherein the comonomer diol is ethylene glycol.

20. A shaped article obtained from the poly(trimethylene dicarboxylate) of claim 1.

21. The shaped article of claim 20 that in the form of a container, compression or injection molded part, tile, film, and engineered component.

22. The shaped article of claim 20 further comprising mineral filler.

23. A bottle comprised of the poly(trimethylene dicarboxylate) of claim 1.

24. The bottle of claim 23 wherein the poly(trimethylene dicarboxylate) is poly(trimethylene terephthalate).

25. The bottle of claim 23 wherein the poly(trimethylene dicarboxylate) is poly(trimethylene naphthalate).

26. The bottle of claim 23 wherein the bottle comprises a blend of poly(trimethylene dicarboxylate) and poly(ethylene dicarboxylate).

27. The bottle of claim 23 wherein the bottle comprises a blend of 35-65 weight % poly(trimethylene dicarboxylate) and 65-35 weight % poly(ethylene dicarboxylate), by weight of the polymer in the blend.

28. The bottle of claim 23 wherein the bottle comprises a blend of 40-60 weight % poly(trimethylene dicarboxylate) and 60-40 weight % poly(ethylene dicarboxylate), by weight of the polymer in the blend.

29. The bottle of claim 23 further comprising mineral filler.

30. A process of making a shaped article comprising making a parison comprising the poly(trimethylene dicarboxylate) of claim 1 and blowing the parison into the shaped article.

31. The process of claim 30 wherein the shaped article is a container.

32. The process of claim 30 wherein the shaped article is a bottle.

33. The poly(trimethylene dicarboxylate) of claim 19 wherein the comonomer diols are 2,2-diethyl-1,3-propane diol, 2-ethyl-2-(hydroxymethyl)-1,3-propane diol, 1,6-hexanediol, 1,8-octanediol, 1,10-decanediol, 1,12-dodecanediol,

\* \* \* \* \*